United States Patent [19]

Weaver

[11] Patent Number: 5,102,803
[45] Date of Patent: Apr. 7, 1992

[54] SEWAGE SLUDGE AND ORGANIC GARBAGE COMPOSTING APPARATUS

[76] Inventor: Lloyd E. Weaver, 14 Homeplate, Topsham, Me. 04086

[21] Appl. No.: 623,845

[22] Filed: Dec. 6, 1990

[51] Int. Cl.$^5$ .................................. C12M 1/107
[52] U.S. Cl. ............................. 435/315; 435/312; 435/313; 422/184; 422/209; 261/87; 366/281; 366/282; 366/283
[58] Field of Search ............... 366/281, 282, 283, 284, 366/102; 435/312, 313, 315; 422/184, 209; 261/87

[56] References Cited

U.S. PATENT DOCUMENTS

| | | | |
|---|---|---|---|
| 1,618,461 | 1/1923 | Matchette | 435/313 |
| 3,400,051 | 9/1968 | Hofschneider | 435/315 |
| 3,905,585 | 9/1975 | Wallman | 366/282 |
| 4,249,828 | 2/1981 | Condolios | 366/102 |
| 4,255,389 | 3/1981 | Jung et al. | 422/184 |

*Primary Examiner*—David L. Lacey
*Assistant Examiner*—N. Edwards
*Attorney, Agent, or Firm*—Saulsbury: Laforest S.

[57] ABSTRACT

An apparatus for composting city sewage sludge and organic garbage to provide rich humus topsoil for city and private use. A continuous rotation of an aeration lift arm over the floor of a cylindrical tank, lifts the sludge to split it open to provide controlled dynamic aeration therewithin and to maintain bacteria action over periods of time and on demand in response to a temperature probe set at 150 degrees Fahrenheit. Cooperating equipment comprises an air blower, a motor driven arm operable upon a central drive sleeve device to rotate the aerator lift arm, and an exhaust pump for removing hot gases resulting from the bacteria action. The full compost mass is lifted over an inclined surface to a height and spilled over a raised trailing edge of the aerator arm closed with a back wall plate. The back wall plate has valved openings through which varying amounts of air are delivered from the hollow aerator arm to different radially volume-extended mass areas. These openings are supplied from plenum spaces with damper valves adjustably controlled from a switchbox exteriorly carried on the motor drive arm. A motor drive mechanism carried on the drive arm has a sprocket pinion that travels along a sprocket chain stationarily carried on the fixed sprocket on the top of the tank to pull the arm thereabout.

17 Claims, 4 Drawing Sheets

SEWAGE SLUDGE AND ORGANIC GARBAGE COMPOSTING APPARATUS

BACKGROUND OF THE INVENTION

This invention relates to an apparatus for composting sewage sludge from sewage treatment plants and organic garbage wastes. Municipal sewage sludge has been composted for some time. Most sewage treatment plants now treat the solids only for purification of liquid content and the resultant solids are delivered to dumps or spread upon land areas in their sludge form without further treatment. With adequate and proper equipment, these solids can be composted for adequate disease control, bagged and sold as rich humus topsoil by the city to add to the city income. With the present procedure and rate of increase of population and with water treatment system demands, it is becoming mandatory to augment these systems with more environmentally acceptable means to dispose of sludge wastes from treatment plants. Recycling of sewer wastes is thus the order of the day. By processing sludge wastes into topsoil products, the sludge can be made usable for road construction, horticultural and other landscaping uses. Fast decomposing is a result of continuous mixing and uniform properly controlled aeration. Cellulosic trash such as paper and sawdust can be included with the messy organic sewer wastes to give dryness to the mixture. In garbage composting, metals, plastics and glass need to be separated from the mass to provide acceptable resultant compost material. Sewage sludge and organic garbage and wastes are easily composted and a non-odiferous, soil-like, compost fertilizing material results.

GENERAL STATEMENT

The present composting apparatus is adapted for treatment of city sewage sludge and organic garbage. It is of an in-vessel tank type that has a radially-extended rotating undercutting aeration arm inclined wedge-like structure that is journaled to and self-aligns itself upon the base floor of the tank and rides in part on wheels to reduce friction while the wedge action is effected to lift and aerate the organic material being composted and as it drops from the raised trailing edge of the rotating aerator arm. Care is taken to have a smooth polished-like lifting wedge surface of plastic over which the compost mixture is lifted to reduce friction and lessen power requirements. The lifting wedge action splits open the sewage sludge and/or organic waste material as it flows over the top apex of the wedge. The splitting action allows the carbon dioxide and other hot gases to be removed by a suction fan from top space above the material while at the same time injecting fresh air under pressure along the top trailing edge of the lifting aerator wedge of the piled compost mix or mass being treated. No other apparatus has supplied dynamic aeration of air in this manner for heavy duty composting equipment. This large wedge is connected to a large diameter central drive sleeve or column that at its upper end is pinned to a sturdy crank arm that extends radially-outwardly over the top of the large cylindrical tank. A special electric motor-driven gear reducer mechanism is carried on the outer end of the crank arm and that is connected through a chain to a stationary sprocket-like member periphally fixed to the top of the tank and the chain wrapped fully about this sprocket member on the tank. Drive, guide and tightening sprockets depend from the gear reducer and the outer end of the crank arm from which the chain extends and by which the crank arm and central drive sleeve is worked and wedge arm rotated to aerate the compost mixture. The powered gear reducer and air blowing equipment mounted on the rotating crank arm are powered through a slip ring assembly mounted on the top of the central vertical drive sleeve to be driven thereby. This arrangement is such of all important drive elements to permit easy access for their routine maintenance.

Further, with this invention, the aeration problem in large composting apparatus is solved in an effective way. Mixture temperature profile is effectively adjusted by making the aeration delivery amount adjustable along the radial length of the trailing end of the aerator and temperature control operable. Electrical costs are kept to a minimum because little horsepower is required for the effective use of the wedge. As mentioned previously, wedge lifting action breaks apart the mixture and enables fresh air to be added by an aeration blower with a minimum of resistance and keeps down blower requirements. Exhaust blowing for generated gases from the mixture being treated will be minimal and controlled by an odor control apparatus at the side of the tank that requires even less energy than the aerator blower. The composting mixture may be initially treated drying substances such as paper, sawdust and the like to have the correct moisture content and bulk density for the efficient processing of the composting mixture. This composting apparatus has to properly aerate the mixture and remove the generated carbon dioxide and like gases and moisture vapor resulting from the bacterial action that cannot be done with prior sewage sludge treating processes. By rotating the aeration wedge through all of the mixture provides a mixing action to level out batch mixing errors and top of the mixture to form a uniform depth, and uniformally aerates the mixture. And this same dynamic wedge action enables air to be introduced into the composite mixture directly from under the top apex trailing edge of the aerator at a point where air resistance will be less because the compositing mixture will have been fractured apart the greatest amount. Aeration takes place throughout the entire length of the radially-extending wedge to oxygenate the bacteria in a uniform manner and provide efficient, dynamic aeration action. The amount of aeration will be based upon bacteria needs as evidenced by a temperature recorder controller as a part of the temperature responsive equipment.

The temperature of the compost mass is maintained in the range of 131-150 degrees Fahrenheit and well above pasteurizing temperatures as required by the Environmental Agency standards and required to be maintained continuously for some three days. From the dynamic aeration of the rotating aerator, the mixture will periodically and automatically receive air as needed by an interval timer that simultaneously activates the wedge aerator drive motor, the necessary aerator pressure blower and the compost off-gas suction exhaust blower. The timer is set so as to not allow any cooling down of the mixture. When aeration is needed in excess to the periodic timer setting, the temperature sensor within the compost mass takes over and aeration is started up in response to temperature requirements.

By causing the mixture in the vessel to travel up and over the trailing apex of the aeration wedge lifter that measures some nine percent of the total height of the mixture within the tank. The mixture is split apart in a complete and random way to allow the carbon dioxide and other waste gases to easily escape and rise up through the piled mass into the overhead space within the tank from where they are exhausted by a suction blower that is operated along with the fresh air aeration blower. The adjustable vertical air gaps along the back apex of the aeration wedge also allow simple control of aeration and resulting mixture radial temperature profile control along the radial length of the aerator. All parts of the composter are rugged and submit to heavy duty to provide for long lasting equipment, low capital cost, low power and maintenance requirements and high temperature operation to obtain the complete disease kill and pasteurization that city sewer districts require. A topsoil product is developed at low cost, and is a product that can be bagged and sold as fertilizer of high quality.

To enhance composting action the compost mass must be broken up and continuously infiltrated with large quantities of air as from a blower so as to speed up the composting process. With this apparatus a large cylindrical walled tank if filled to a point such the process may be completed within a five-day time period, the extent of the filling of the tank depending upon the nature of the sludge and organic mixture being supplied for the process. Micro-organisms require slude and require a great amount of oxygen to be highly active for effective composting action. The organic material provides the food for the microorganisms that, in turn, give off heat for decomposition and to kill the disease content. This heat is especially needed during cold winter months to effect the pasteurization of the human sludge waste within the compost mixture. Thus, with the great amounts of the heat provided by the natural composting of the compost mixture, this apparatus will be highly effective and have great flexibility in cold climates. In warm climates, larger air quantities may be required to prevent overheating of the mixture and killing off of the essential micro-organisms. The fracturing action of the wedge allows the gases to easily escape particularly when the top of the in-vessel tank is maintained under vacuum pressure for exhausting the hot gases resulting from the action. Vapor is removed along with the gases. Thus, micro-organisms are afforded the proper amount of air to grow in. The diameter of the tanks can vary up to tens of teet, but the total interior height should be kept at about twelve feet and the tank loaded to but eight feet to prevent overloading upon the lifting wedge aerator. The temperature limit will be set at some value in excess to maintain a working temperature in the range of 131 to 150 degrees Fahrenheit. The initial compost material is poured into an opening in the top of the closed tank or through a raised front access door opening in the cylindrical tank wall of the tank and the resultant finished composted product taken out through a trap door opening in the base floor of the tank and conveyed to a bagging station by a bulk delivery conveyance or shoveled from through a floor level maintenance door opening.

Since the composting action is complete after the processing period, and to quickly cool down the product to prevent airborne contaminates from seeding the sterilized compost, it has been found advantageous to mix a small proportion of sand with the resulting compost product and at the time time achieve the desired blend of sand and compost for the bagging of the final soil mixture that is effected immediately after the completion of the stepped up composting action of the mass composting mixture.

OBJECTS OF THE INVENTION

It is the principal object of the present invention to provide a dynamic aeration energy efficient apparatus for composting large masses of sewage sludge and organic waste in a rapid manner while maintaining a temperature range of 131 to 150 degrees Fahrenheit for a period of some three days continuously to complete the composting process thereby complying with the Environmental Protection Agency standards.

It is another object of the invention to provide in a composting apparatus an undercutting rotary aeration wedge-shaped lifting arm with uniform trailing apex height having air release on the underside thereat, back of this apex, including means to adjust air release quantities along the trailing vertical back face of the wedge within volume area segments created by trailing vertically-extending attached barrier plates to and extending rearwardly from the vertical back face of the wedge with such segments and adjustments being present in order to even out the radial temperature profile of the mass compost material by means of varying the amounts of air forced into each volume area segment, and to compensate for the higher peripheral velocity of the wedge aerator arm is rotated, the minimum slope being at the outer periphery of the wedge, to uniformly reduce the slope of the wedge in proportion to the radius of the wedge from the center to the outside edge, whereby as the aeration wedge rotates, uniform aeration, waste gas and moisture removal created throughout the radial extent of the compost mass while minimizing the power requirements of the aeration pressure blower and exhaust draft off gas suction blower or vacuum pump and with rotation of the aerator arm being about once in every eight minutes.

It is still another object of the invention to provide in a heavy duty city sewage sludge and organic garbage composting apparatus a confined gas stream to eliminate personnel exposure to composting off-gases with the usual means to scrub these gases whereby potentially hazardous dust particles will be confined to the scrubbing media thereby making the working conditions about the apparatus kept non-hazardous.

It is a further object of the invention to provide a city sewage sludge and organic garbage composting apparatus with an adjustable automatic control system, operable from a temperature probe lying within the compost mass, for the supply of air and the exhausting of gases resulting from the composting action and vacuum creation in the top of the tank.

Further objects of this invention are to provide a heavy duty city sewage sludge and organic garbage composting apparatus, having the above objects in mind, which is of simple and rugged construction, relatively inexpensive to manufacture, has a minimum number of parts, easy to assembly, easy to load with raw composting mass mixture and discharge the final compost product, has an effective heavy drive assembly efficient and is automatic in operation in response to the temperature generated by the worked composting mixture.

BRIEF DESCRIPTION OF THE DRAWINGS

For a better understanding of the invention, reference may be had to the following detailed description taken in connection with accompanying drawing, in which.

DETAILED DESCRIPTION

Referring now to the figures, there is shown generally a base floor 15 with a cylindrical metal wall 16 extending upwardly therefrom, that will be heavily insulated to save composting heat, a large diameter sleeve or drive sleeve or drive sleeve means or drive sleeve 17 centrally supported for rotation upon the base floor 15 and arranged to drive a radially-extending wedge-like lift aerator arm 18 over the base floor 15. As the aerator arm is rotated under the sewage sludge and organic garbage compost mixture, a large quantity of air under pressure is delivered as the mixture passes over the raised trailing end face 18' of the aerator that is of equal height throughout the full radial extent of the aerator arm. The central drive sleeve means 17 extends upwardly through a bearing sleeve 19 laterally supported by circumferentially spaced I-section beam arms 21 extending radially from the top of the cylindrical wall 16 to the bearing sleeve 19. These arms 21 are rigidly secured to a sprocket flange ring 22 that has a series of spaced sprocket teeth 23 extending about the full periphery of its outer edge. This sprocket ring 22 is a rigidly secured to the top edge of the cylindrical tank wall 16.

Fixed to and extending radially from the upper end of the drive sleeve 17 and over the top of the tank cylindrical wall 16 and outwardly thereof is a drive arm 24 by which the drive sleeve means 17 and the wedge-shaped lift aerator 18 are driven. This drive arm 24 is of inverted-channel section and has a hole 24' upwardly through which the open end of the drive sleeve 17 extends. The connection of the drive arm 24 with the sleeve 17 is made by a drive pin 26 that extends transversely through the depending flanges of the channel section drive arm 24 and the sides of the drive sleeve 17. A removable cover 17' is fixed over the open end of the drive sleeve 17 that extends upwardly through the hole 24' in the radial drive arm 24. Upon release of this cover 17' physical access can be had to the interior of the sleeve 17 to fix parts therein.

The outer end of the radially-extending drive arm 24 extends outwardly of the cylindrical tank wall 16 and carries a vertically-extending electric chain drive mechanism 30 that has a drive sprocket pinion 30'. A sprocket chain 31 extends from the drive pinion 30' and around the rigid top flange ring 22 for engagement with the sprocket teeth 23 thereon. As the chain drive mechanism 30 is run, it works along the sprocket chain taking or pulling the drive arm 24 with it and thereby working the drive arm 24 over and about the top of the apparatus to rotate the central vertically-extended drive sleeve means 17 and wedge aerator left arm 18 extending radially therefrom directly below the drive arm 24.

Also, for mesh with the chain 31 is a sprocket guide or idler pinion 32 and a chain tightener sprocket pinion 33 depending from the outer end of the drive arm 24, FIGS. 1 to 4. In this way, the chain 31 is kept outwardly of the fixed sprocket ring 22 to permit the drive mechanism 30 to be worked along the chain 31 with little difficulty and to pull the arm 24 thereabout. The drive chain 31 is accordingly merely carried by the fixed sprocket ring 22 and without peripheral movement thereabout.

Figure 1:
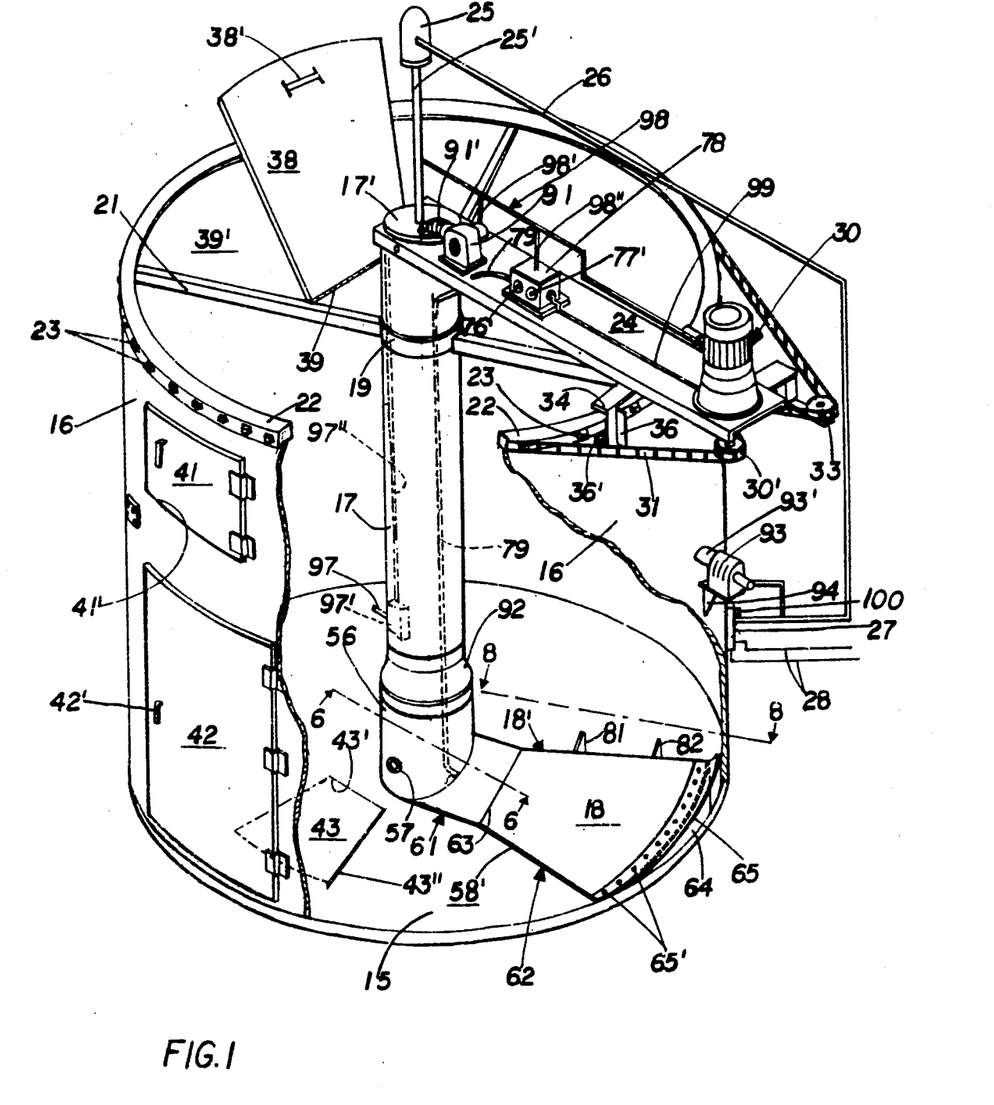
FIG. 1 is a top and vertical perspective view of the sewage sludge and organic garbage waste composting apparatus embodying the features of the present invention with portions of the vertical cylindrical containing wall being broken away to show the operating parts therewithin.
Figure 2:
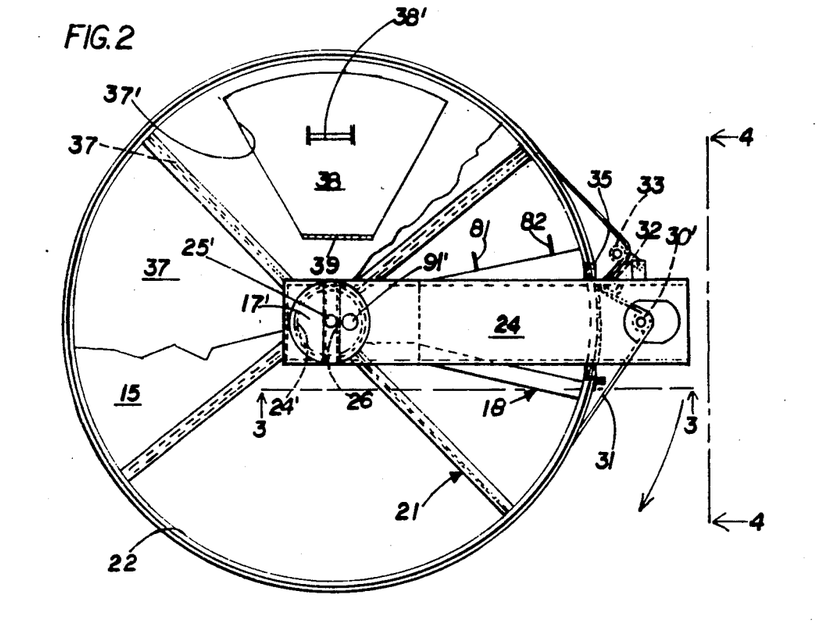
FIG. 2 is a top plan view of the apparatus looking upon the radial drive arm free of equipment carried thereby and broken away to look partially in plan upon the wedge lift aerator arm directly under the radial drive coextensive therewith and over the bottom floor of the cylindrical tank.
Figure 3:
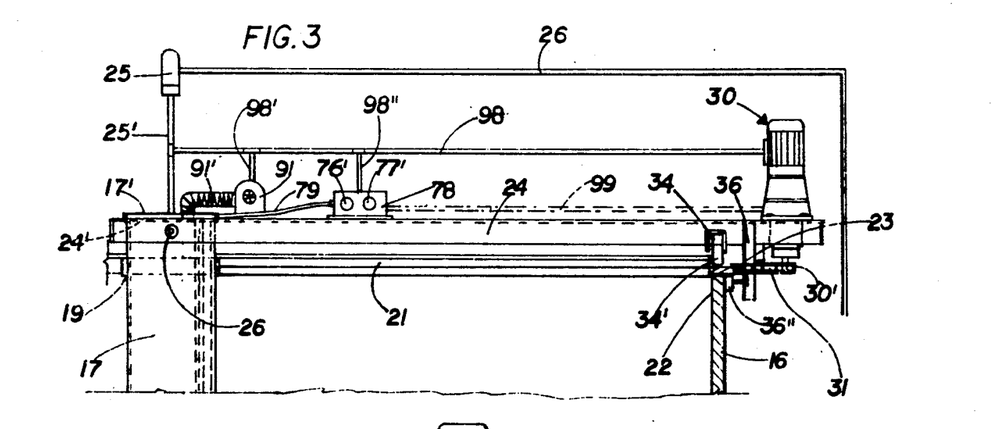
FIG. 3 is an enlarged fragmentary vertical sectional view looking in elevation upon the radially-extending drive arm assembly as viewed generally on line 3—of FIG. 2.
Figure 4:
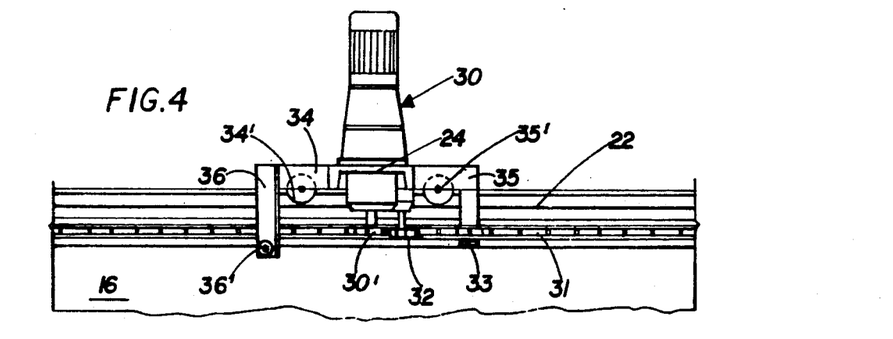
FIG. 4 is an enlarged fragmentary and elevational view looking in elevation upon the electric motor-driven gear chain drive mechanism as viewed generally upon line 4—4 of FIG. 2.

Extending laterally from the sides of the radial drive arm 24 are wheel support projections 34 and 35 that respectively have small support wheels 34' and 35' that travel over the fixed sprocket ring 22 to support the outer end of the drive arm 24 that is weighted by the drive mechanism 30, and other equipment, FIG. 4. To prevent lifting of the leading edge of the drive arm 24, a bracket 36 depends from the outer end of the lateral projection 34 that has a hold down wheel 36' that runs along the underface of the fixed sprocket ring 22, FIGS. 1 to 4.

A cover plate 37 extends across the bearing support arms 21 and fixed sprocket ring 22 to enclose the full top of the cylindrical wall 16. This top cover plate 37 has an inlet opening 37' that is closed by a top door 38 hinged to the cover plate 37 at 39 and lifted by its handle 38' to an open position. The sewer sludge and organic garbage compost mixture will be poured into the apparatus through this opening 37' from a conveyor at the high level to fill the composting apparatus for operation or by conveyor filed through the small hinged door opening 41' the wedge 18 can be left on to level out the mixture by its rotation thereunder. Because of the leveling action of the rotating wedge, aerator left arm 18 there is little need for leveling means that could be extended laterally from the drive sleeve 17 to drag across the top of the compost mixture. With the apparatus may be charged with the compost mixture and a good supply of air delivered to the mixture, much heat will be generated resulting from the oxygenation of bacterial content of the compost material or mixture.

To the drive sleeve cover 17' of a collector slip ring assembly 25 is connected by its stem 25' through which wire cables are passed and rotated within the collector ring assembly 25 from the cover 17' while its outer casing is held stationary by a cable conductor 26 extending from an electric switch box 27 to which electric current is supplied from a source by power cable wires 28. The purpose of this collector ring assembly 25 will be made more apparent from the description of the line wire diagram of FIG. 10.

The sewer sludge material before delivery is deprived of as much water as possible at the sewage treatment plant. The size and volume of the apparatus will vary with the volume of sludge output of city treatment plants. Dry sawdust, wood ash, or shredded paper may be added to the sludge to lessen its liquid content. All doors will be tightly fitted and sealed to prevent unwanted air infiltration and leakage of obnoxious gas from the apparatus.

Figure 9:
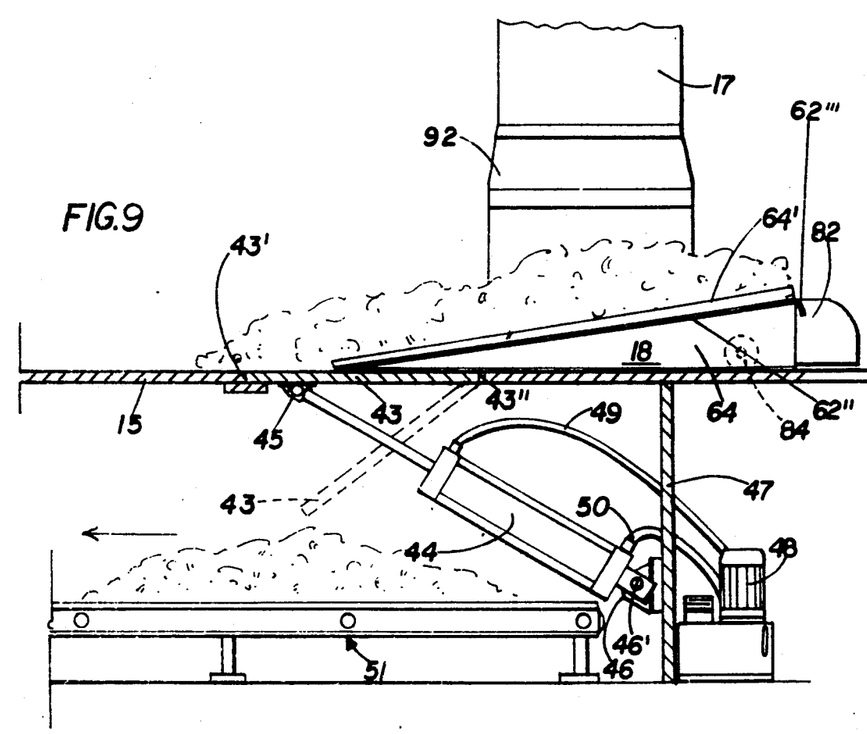
FIG. 9 is an enlarged fragmentary vertical sectional view of the discharge arrangement at the bottom of the apparatus for discharging and conveying the finished compost material therefrom.

By opening a full heavily hinged floor level door 42, the apparatus may be entered for maintenance and emptied of its dry final contents. The door 42 is latched closed by a heavy latch lever 42' to withstand the compost load, FIG. 1. The apparatus may be more often unloaded of the final dry compost material through a bottom opening 43' closed by a trap door 43 hinged to the base floor 15 at 43" and operated from beneath by a hydraulic cylinder 44 and held closed tightly thereby against the floor 15, see FIGS. 1 and 9. The cylinder 44 is two-way and is pivotally connected to the door 43 at 45 and by a pivot pin 46' to a bracket 46 on a vertical wall 47. A motor-operated fluid pressure generator 48 supplies fluid under pressure and return through hose connections 49 and 50 to the cylinder 44. A belt conveyor mechanism 51 underlies the trap door opening 43' onto which the finished compost material or product is spilled to be conveyed away from the apparatus to bagging equipment and distribution in its composted form ready for use as fertilizer.

With the trap door 43 lowered by the cylinder 44 the compost product will be pushed through the bottom opening 43' by the aerator arm 18 serving as a scoop for passage over the base floor 15 and bottom opening 43' to unload the apparatus of its finally processed product.

Figures 5, 6:
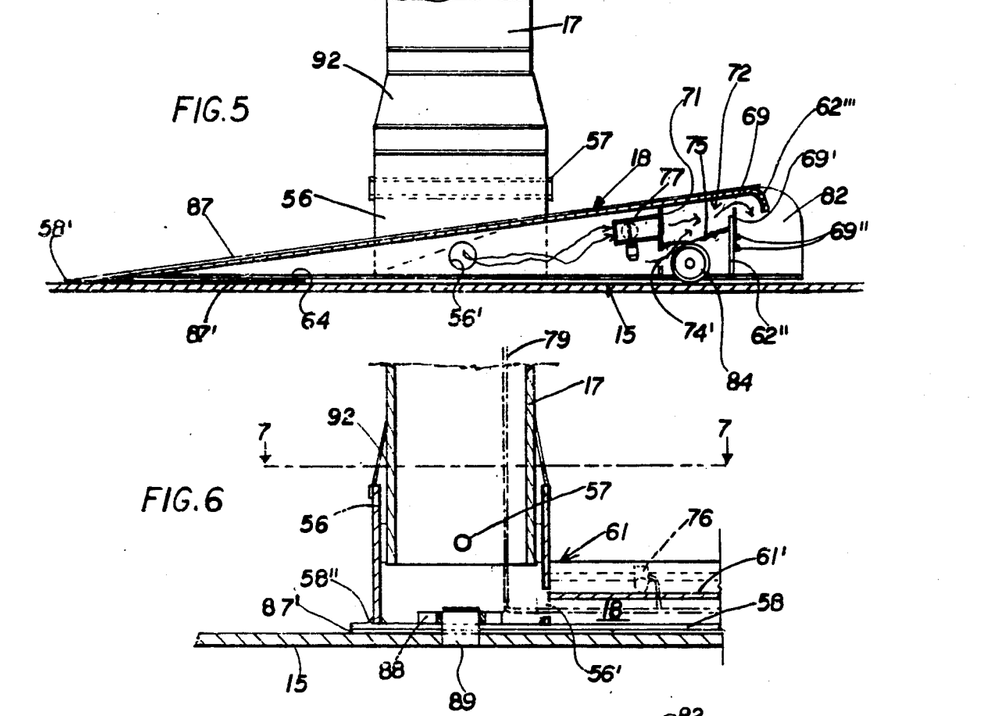
FIG. 5 is an enlarged transverse sectional view of the wedge lift aerator arm and looking in elevation upon the central drive sleeve structure as viewed generally on line 5—5 of FIG. 7, the curved end plate of the aerator arm being removed.
FIG. 6 is an enlarged fragmentary vertical sectional view of the drive connection of the wedge lift aerator with the vertical drive sleeve as viewed generally on line 6—6 of FIG. 1.

A detail description will now be made of the wedge-shaped lift aerator arm 18. The aerator lift arm 18 has a vertically-extending hub sleeve 56 on its inner end that is drivingly connected to the central drive sleeve 17 by a drive pin 57. The parts of the aerator arm structure 18 are bent and shaped with an inner edge curvature to conform with the curved outer surface of the hub sleeve 56 for full flush engagement therewith and welded to the sleeve 56 in an air tight manner. This aerator arm 18 has a full base plate 58 leading from the forward edge 58' thereof to its rear face edge 18' to which the lower end of the hub sleeve 56 is welded at 58", FIG. 6.

Figure 7:
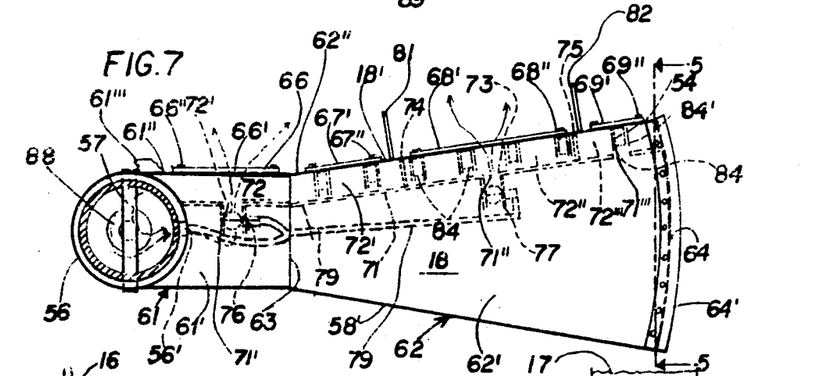
FIG. 7 is a top plan view of the wedge lift aerator arm extending laterally from its drive sleeve as viewed generally from line 7—7 of FIG. 6.

The aerator arm 18 is formed generally of two hollow sections, FIG. 7, a section 61 or arm section 61 of equal width throughout its radial extent and a section 62 of segmented shape and radially-extending from a welded connection 63 with the outer end of the arm section 61 to the outer end of the entire arm 18. With the two hollow sections 61 and 62 so joined, one rigid hollow aerator arm 18 is provided. The bottom plate 58 covers the full radial extent of the aerator arm 18. The arm section 61 has an inclined top face plate 61' leading upwardly from leading edge 58' of bottom plate 58 to a rear face plate 61" and joined with upwardly to face 62' and inclined of less angle than top face 61 of the section 61 and providing with the inclined top face plate 61' a continuous inclined face of varying degree inclination throughout the radial extent of the aerator arm 18 beginning from the hub drive sleeve 56 and outwardly to the vertically-extending cylindrical wall 16. The outer end of the aerator arm 18 is closed by a curved plate 64 conforming to the cylindrical wall curvature and running along the top of the curved plate 64 is a flexible wiper 65 to keep the compost mixture from spilling off the end of the aerator arm 18 as the mixture is lifted for aeration. The connection of the wiper 65 to the aerator arm 18 can be effected by adhesion or by a series of bolts 65'.

The inclined top face plates 61' and 62' rise to the same elevation at their trailing ends of the respective arm sections 61 and 62 and are respectively supported by respective rear wall plates 61" and 62" that are of the same height so as to lift the compost mixture uniformly the same amount throughout the radial extent of the aerator arm 18 by which the compost mixture is fractured and spilled thereover for aeration. These inclined lift face plates 61' and 62' of the sections 61 and 62 provide a full lift surface for the aerator lift arm 18 and respectively have curved down extensions 61''' and 62''' to break up the spillage over the rear wall plates and to keep the same from their air openings thereunder as soon will be apparent from further description.

Extending parallel to and forwardly spaced from the main rear wall 18' of section wall plates 61" and 62" is a plenum wall 71 to provide a plenum space 72 for the distribution of air to the air discharge openings 66, 67, 68 and 69 in the trailing rear wall 18' of the aerator arm 18. This plenum wall 71 is formed from united parts of the aerator sections 61 and 62 and runs the full radial length of the aerator arm 18. This plenum space 72 is divided along its radial extent by spaced vertical walls 74 and 75 to provide plenum spaces 72', 72" and 72''', FIG. 7. In the plenum wall 71 are three openings 71', 71" and 71''' through which air is delivered under pressure to the respective plenum spaces 72', 72" and 72''' from the main hollow space within the aerator arm. A maximum delivery of air is needed for the outer radial wall opening 69 for the greater outer mass volume area of compost mixture and is supplied with air therethrough and passes uncontrolled through a free plenum wall opening 71'''. Since the inner mass volume areas take less air, they need to be controlled relative to air being delivered to the outer radial mass area, plenum wall openings 71' and 71" respectively have vane valve assemblies 76 and 77. Each vane assembly 76 and 77 consists of an open sleeve, a vane valve therein and an electric actuator extending from the sleeve and wired at 78', 78" into the electric system as shown in the line diagram of FIG. 10, and adapted to be set from an external switch box 78 on the radial drive arm 24, FIG. 1 with two switch dial thermostats 76' and 77' respectively for respective valve assemblies 76 and 77. Thus, the air passed to the plenum spaces 72' and 72" and rear wall openings therefrom is delivered to the inner radial mass volume areas of the compost mixture that are controlled externally from switch box 78. A wire cable 79 extends from the vane valve assemblies 76 and 77 from the aerator arm 18 through opening 56' in its hub sleeve 56 upwardly through the drive sleeve 17 and outwardly along arm 24 to the switch box 78. To keep the air delivered through rear wall openings from passing laterally to adjacent mass volume areas and confined to the intended mass volume areas, radially spaced, rearwardly-extending vertical barrier plates 81 and 82 are extended from the rear wall face plate 18' within three mass volume areas. The air supply to these three volume areas are separately controlled through the vane valve assemblies and openings in the rear wall face plate 18' and the rearwardly-extending barrier plates 81 and 82.

Volume air is supplied to the aerator arm 18 from a motor driven air blower 91 mounted on drive arm 24 at the top of the apparatus and that has a discharge conduit 91' attached to air tight sleeve cover 17' of drive sleeve 17 to deliver air under pressure downwardly through the enlarged hole 56' in aerator hub sleeve 56 into the hollow aerator arm 18 for distribution through the discharge openings 66, 67, 68 and 69 in the rear wall face plate 18' in the manner above described. An apron-like shield 92 is draped about the sleeve 17 and down over the aerator hub sleeve 56 to prevent leakage of the mass into the hub sleeve 56 and of air out from the drive sleeve 17. A sufficient overall quantity of air must be continuously supplied to maintain a temperature of in the range of 131°–150° Fahrenheit necessary for favorable bacterial action.

Large quantities of carbon dioxide and other hot gases result from the bacterial composting action and rise into the top space of the apparatus from where they are exhausted by a motor-driven suction blower or vacuum pump 93 and exhaust tube 93' mounted on the cylindrical tank wall 16, by a bracket 94 above current supply box 27. Description has been made above of the radial arm 24 and sprocket chain 31 carried on large stationary sprocket 22 on the top of the tank wall 16 and with which by motor-driven mechanism 30 and its drive sprocket 30', on the outer end of the drive arm 24, are connected to work the arm 24, drive sleeve 17 and aerator arm 18 about the interior of the apparatus. The drive arrangement is such that the aerator arm 18 will make one revolution in every eight minutes delivering air to the composting mixture as the aerator arm 18 is rotated.

For the support of the aerator upon the base floor 15, the outer section 62 has a series of small supporting wheels 84 journalled in brackets 84' in axially-spaced locations adjacent the trailing end of the aerator and upon the bottom plate 58 for rolling engagement with the base floor 15. The forward edge 58' of the aerator 18 closely overlies the base floor 15 so as to pick up the full mass height of the compost mixture for passage over the joined top inclined face plates 61' and 62' of the aerator 18. To reduce friction and lessen power requirements, a smooth high polished plastic sheet 87 is spread over the entire lift surface and adhered thereto. Also, a polished plastic sheet 87' is spread under the aerator bottom plate 58 extending from the starting lift edge 58' and running at some distance thereunder. This sheet 87 will have but light contact with the base floor to reduce friction with passage thereover, FIGS. 5 and 6.

The principal support for the forward edge of aerator 18 welded at 58" and a lateral thrust bearing 88 welded to the bottom plate 58 and operable about a vertical-extending stud 89 fixed to the center.

The vertical drive sleeve 17 is both supported by and drivingly connected to the aerator hub sleeve 56 of the aerator 18 by pin 57 so that both the drive sleeve 17 and aerator 18 are journalled about the central base floor stud 89 through lateral thrust bearing 88.

Figure 8:
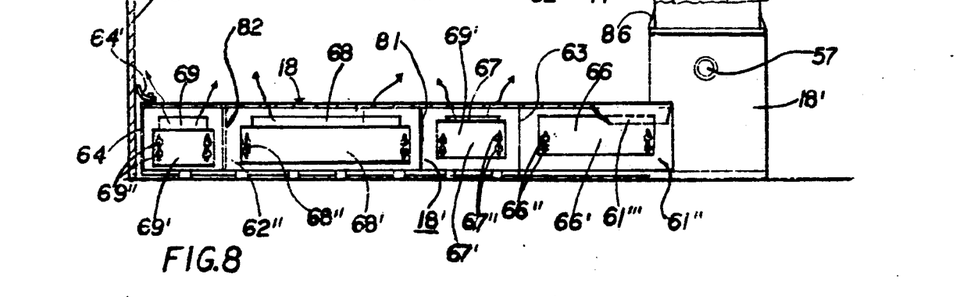
FIG. 8 is an elevational view of the elevated air delivery face at the trailing end of the aerator arm.

The rear wall plate 61" of the hollow aeration section 61 has an elongated air discharge opening 66 and a vertically adjustable valve plate 66' retained by releasable screw bolts 66" so that the amount of air to the inner area of the mass compost mixture may be varied, FIG. 8. In the rear wall plate 62" of the segmental aeration section 62 are the three radially-aligned elongated discharge openings 67, 68 and 69 that respectively have vertically-adjustable valve plates 67', 68' and 69' that are respectively retained in their adjusted positions over their corresponding openings by releasable screw bolts 67", 68" and 69", see FIGS. 7 and 8. By these air openings and adjustable valve plates, which begin from the radial interior of the mass compost adjacent the central drive sleeve 17 and extend outwardly to the cylindrical wall 16, the air distribution can be varied for the best distribution of air to the different volume areas of the compost mass. The outer volume mass areas of the compost mass are greater than the inner volume mass areas. The greater mass volume area must have more air for bacterial action than with the lesser volume mass area. Thus, more air should pass through the outer radial rear wall opening 69 than through inner openings 66, 67 and 68. The difference in air distribution will be controlled by the damper valve assemblies 76 and 77, as well as by the adjusting of vertically-adjustable valve plates 66', 67', 68" and 69" over their respective openings 66, 67, 68 and 69.

A temperature sensitive thermocouple element 97 is carried on the sleeve 17 by an internal box 97' which has a cable 97" that extends up through the sleeve 17 and its top cover 17' and drive shaft 25' of the collector slip ring assembly 25 to close the supply circuit by the collector rings when the temperature in the compost mixture is below the range of 131 to 150 degrees Fahrenheit. The collector ring assembly 25 is fed power from the current supply box 27 by the rigid cable enclosure 26 that keeps the collector exterior stationary while collector rings are rotated within by the shaft 25' extending from sleeve cover 17' of central drive sleeve 17 that is driven by arm 24. From the same shaft 25' of the collector ring assembly 25 power is fed outwardly through a cable enclosure 98 that extends over the drive arm 24 to the drive mechanism 30 thereon, FIG. 1. Branch cable enclosures 98' and 98" lead respectively to motor driven air pump 91 and switch box 78. A further cable enclosure 99 extends from switch box 78 along the drive arm 24 to drive mechanism 30 to effect its operation in response to the temperature control setting of temperature recorded controller 100 that is located on the main switch panel 27 at the side of the tank wall 16.

The following description will now be made of the wiring of diagram FIG. 10 which is the power and control circuit for the composter. Generally, the relays 101, 102 and 103 located on panel or switch box 27, control circuit voltage VI and power voltage V1' that is 110 V single phase power, but may be of any standard control or power voltage on being designed into the components of the apparatus.

A temperature transmitter 104 within box 97' is responsive to the thermocouple element 97 on the sleeve 17 and delivers a 4–20 milliamperes varying current to the temperature recorder controller 100. The rotating shaft 25' of the collector slip ring assembly 25 is driven from the cover 17' of the drive sleeve 17 and has a set of collector rings 106, 107, 109, 111 and 112. Rings 106 and 107 are power slip rings, rings 111 and 112 are probe instrumentation slip rings and ring 109 is a ground ring. Rigid conduit 26 of FIG. 1 contains wires for the power slip rings 106, 107 and the ground ring 109, and the probe instrumentation slip rings 111 and 112 through which is led a standard 4-20 milliampere measurement current V2 to the temperature recording controller 100.

Figure 10:
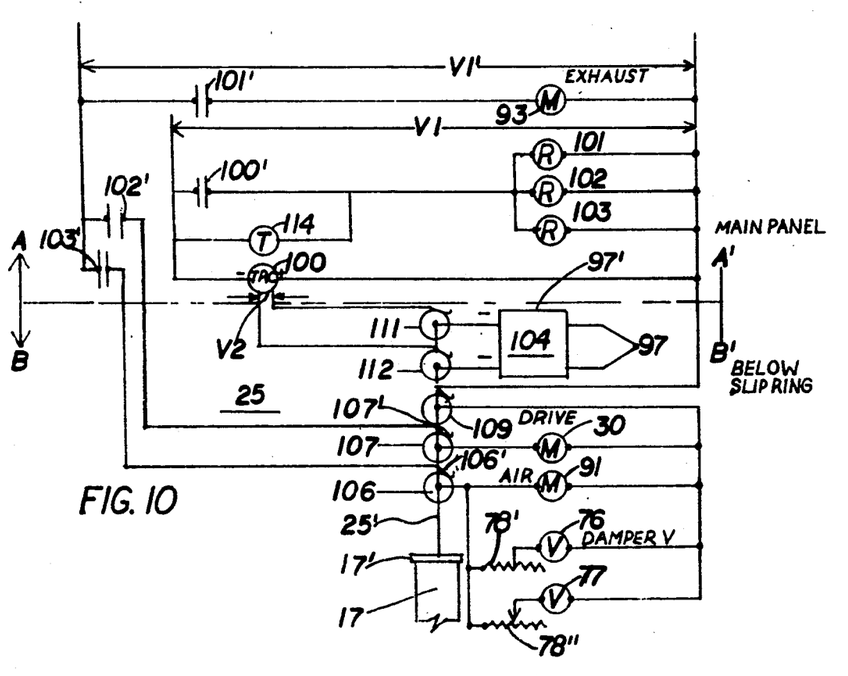
FIG. 10 is a line diagram of the electric power and control system for the present apparatus.

As shown in FIG. 10, the controls generally are physically divided into two parts, one part representing the items within panel 27 on the tank wall 16 and designated as section A—A' and the other part representing items designated as section B—B' and located below the collector ring assembly 25. The motor controls with section A—A' include relay 101 for suction exhaust blower or vacuum pump 93, relay 102 for the drive motor 30 and relay 103 for the blower motor 91. These controls are mounted for easy maintenance and access in the panel or switch box 27 on tank wall 16. The power from the relay contacts 102' and 103' reach the motors on drive arm 24 respectively through contactors 107' and 106' of slip rings 107 and 106. Relay contact 101' for the exhaust fan motor 93 does not need to go through collector slip rings as it is mounted on the outside of the tank 16 and is wired directly to the power panel 27. Slip rings 111 and 112 are silver-coated to accept direct current from the instrumentation transmitter 104 for delivery to the temperature recorder controller 100 and voltage powers thermocouple probe 97. The transmitter 104 has a conventional 4-20 MA output current variation scaled to the temperature range of interest. A person skilled in the art of temperature measurement and control will have knowledge as to what standard components should be used. The temperature transmitter 104 is an integral part of thermocouple probe 97 and will lie within its probe box 97'. The control contacts 100' of the temperature recorder controller 100 actuates all three relays 101, 102 and 103 in unison to control the temperature of the compost mass imparted to the temperature recorder controller setpoint that overrides a timer switch 114 which is also wired to keep all motors running for a minimum on/off time standard way. Timer switch 114 could be typically set to operate all motors for fifteen minutes on and off for fifteen minutes. But this on and off cycle will vary depending upon the type of compost mixture that is deposited in the composter. Generally, such timers for this type of use have fifteen minute intervals.

For many compost mixtures, the timer cycle can be set such that the temperature set point of timer 114 is low enough that the microbes will not be killed off by high temperatures but high enough such that the microbes can reach the setpoint temperature. Temperature recorder controller 100 serves to record the process temperature in the compost mixture and to increase the amount of aeration to cool down the compost mixture if the setpoint temperature in exceeded.

For power supply to the two damper control valve assemblies 76 and 77 in the aerator arm 18, lines 79 are taken from across the blower motor 91 and are respectively adjustable by the dial thermostats 76' and 77' of the switch box 78 on drive arm 24. The volume of air delivered to the different volume areas as the compost mixture is spilled over the trailing end of the aerator 18 may be varied by the thermostats 76' and 77' in the switch box 78.

The relays 101, 102 and 103 respectively include contacts 101', 102' and 103' whereby when closed cause the operation of the several respective motors 93, 30 and 91 with the temperature recorder controller 100 closing contacts 100' upon the thermocouple probe 97 closing below temperatures of 150 degrees Fahrenheit. A favorable temperature of the compost has to be maintained throughout the composting operation for proper bacteria action.

It should now be apparent that a fully automatic apparatus has been provided by which sewage sludge and organic garbage will be converted into dry topsoil material that can be bagged and distributed for city and private use.

While various changes may be made in the detail construction, it shall be understood that such change will be within the spirit and scope of the present invention as defined by the appending claims.

What is claimed is:

1. In a sewage sludge and organic garbage composting apparatus comprising a vessel having a base floor and a cylindrical wall extending upwardly therefrom, pivot means centrally-located upon the base floor, a radially-extending hollow aerator compost lift arm journalled upon the pivot means and positioned and arranged so as to operate over the base floor to lift compost mass therefrom, said aerator lift arm being hollow and having an upwardly surface and rearwardly inclined work lift surface with a raised trailing edge, central drive sleeve means fixed to the aerator lift arm and extending upwardly above the upper end of the cylindrical wall, power means connected to the central drive sleeve means for rotating the central drive sleeve means and the aerator lift arm whereby to lift the compost mass from the base floor and to spill it over the trailing edge of the aerator lift arm and means for delivering air from the trailing edge of the aerator lift arm into the compost mass as it spilled over the trailing edge of the aerator lift arm to aid the decomposition of the compost mass.

2. In a sewage sludge and organic garbage composting apparatus as defined in claim 1, wherein said power means for rotating the drive sleeve means and the aerator lift arm includes a drive arm extending radially outwardly from the central drive sleeve means and over the cylindrical wall, a toothed sprocket-like ring fixed to the upper end of the cylindrical wall, a sprocket pinion drive mechanism carried on the outer end of the drive arm and a drive chain connected between the sprocket pinion and the fixed toothed sprocket ring to pull the drive arm about the cylindrical wall upon lifting the chain from the sprocket-like ring.

3. In a sewage sludge and organic garbage composting apparatus as defined in claims 1 or 2 and said central drive sleeve means includes an upstanding hub sleeve fixed to an inner end of the journalled aerator lift arm surrounding its connection about the pivot means and extending upwardly therefrom and a releasable drive pin extending between the central drive sleeve means and an aerator hub sleeve.

4. In a sewage sludge and organic garbage composting apparatus as defined in claim 3, wherein said hollow aerator lift arm is in flow communication with the central upwardly-extending drive sleeve means for receiving air under pressure and a skirted apron surrounding the aerator hub sleeve and drive sleeve means to prevent the leakage of compost mass and the escape of air from therebetween.

5. In a sewage sludge and organic garbage composting apparatus as defined in claim 1, wherein said hollow aerator lift arm has a leading edge positioned and arranged so as to operate along the base floor with the inclined work lifting surface extending therefrom and a trailing rear wall plate, said trailing rear wall plate has air discharge openings extending radially thereacross for delivering air to the compost mass as the aerator lift arm is driven therethrough and the compost mass spilled over the trailing edge of the aerator lift arm.

6. In a sewage sludge and organic garbage composting apparatus as defined in claim 5, further including adjustable plates extending over the air discharge openings on the rear wall plate of the aerator lift arm to vary the volume flow of air to the different areas of the compost mass.

7. In a sewage sludge and organic garbage composting apparatus as defined in claims 5 or 6, further including a plenum wall extending across the aerator lift arm forwardly of the rear wall plate to provide plenum spaces therebetween for the radial distribution of air to the rear wall discharge openings.

8. In a sewage sludge and organic garbage composting apparatus as defined in claim 7, further including vertically-extending partition plates positioned and arranged in the plenum spaces so as to provide further distribution for delivery of air to the rear wall openings and into the compost mass.

9. In a sewage sludge and organic garbage composting apparatus as defined in claim 8, further including air inlet openings in the plenum wall for the delivery of air to the plenum spaces and having remotely-controlled damper air valve means over the respective air inlet openings for controlling the air flow through the plenum wall openings and the respective plenum spaces.

10. In a sewage sludge and organic garbage composting apparatus as defined in claims 5 or 8, further including dividing barrier plates projecting rearwardly from the trailing rear wall plate of the aerator to confine the air flow to a different radially-extending mass volume areas of the compost mass to provide equalization of air treatment throughout the radial extent thereof.

11. In a sewage sludge and organic garbage composting apparatus as defined in claim 10, further including control switch means positioned on the drive arm externally of the cylindrical wall and wired to the damper valved means for individual adjustment thereof.

12. In a sewage sludge and organic garbage composting apparatus as defined in claim 1, wherein said means for delivering air under pressure to the aerator lift arm includes an air blower having an outlet tube extending into the drive sleeve means and a collector ring assembly extending upwardly from the central drive sleeve means and operable therewith, and further including a temperature responsive probe extending within the vessell so as to contact compost mass and extending from the drive sleeve means and wiring extending from the probe to the collector ring assembly and from the collector ring assembly to the air blower to control its operation.

13. In a sewer sludge and organic garbage composting apparatus as defined in claim 9, wherein said means for delivering air under pressure includes an externally-disposed damper valve switchbox and wiring extending from the damper valve means to the externally-disposed switchbox.

14. In a sewer sludge and organic garbage composting apparatus as defined in claim 1, wherein said aerator lift arm includes a bottom closure plate and a top plate inclined upwardly from its leading edge to said raised trailing edge, the leading edge being constructed and arranged so as to pass over the base floor to pick up the compost material and further including a series of supporting wheels extending from the bottom plate adjacent to the trailing edge of the aerator lift arm to run over the base floor.

15. In a sewer sludge and organic garbage composting apparatus as defined in claim 14, wherein said radially-extending aerator lift arm being closed at an outer end by a curved plate conforming to the shape of the cylindrical wall and a wiper blade carried upon the lift surface of the aerator lift arm and engaging the cylindrical wall surface adjacent thereto.

16. In a sewer sludge and organic garbage composting apparatus as defined in claim 1, wherein said base floor has a discharge opening, a trap door positioned and arranged so as to be lowered from the discharge opening, and said aerator lift arm being positioned and arranged so as to operate over the base floor and discharge opening to direct finally treated finished compost material through the discharge opening.

17. In a sewage sludge and organic garbage compositing apparatus as defined in claim 1, wherein said aerator lift arm further includes an aerator hub sleeve and a hollow aeration section of equal width throughout its radial extent and a segmental aeration section having a segmental shape in plan view and having said raised trailing edge which is further connected to a vertically extending rear air delivery plate running a radial length of the aerator lift arm at equal height throughout the extent of both said hollow aeration section and said segmental aeration section and constructed and arranged so as to provide a greater lifting power to a more weighty radial outer volume of compost in said vessel.

* * * * *